(12) United States Patent
Austin

(10) Patent No.: US 9,937,760 B2
(45) Date of Patent: Apr. 10, 2018

(54) SELF-REGULATING TIRE VALVE

(71) Applicant: Jeremy Austin, Eureka, KS (US)

(72) Inventor: Jeremy Austin, Eureka, KS (US)

(*) Notice: Subject to any disclaimer, the term of this patent is extended or adjusted under 35 U.S.C. 154(b) by 0 days.

(21) Appl. No.: 15/139,853

(22) Filed: Apr. 27, 2016

(65) Prior Publication Data
US 2016/0325593 A1  Nov. 10, 2016

Related U.S. Application Data

(60) Provisional application No. 62/157,677, filed on May 6, 2015.

(51) Int. Cl.
*F16K 15/20* (2006.01)
*B60C 29/00* (2006.01)
*B60C 29/06* (2006.01)

(52) U.S. Cl.
CPC .......... *B60C 29/002* (2013.01); *B60C 29/068* (2013.01); *Y10T 137/36* (2015.04); *Y10T 137/3646* (2015.04)

(58) Field of Classification Search
CPC ............ Y10T 137/36; Y10T 137/3646; Y10T 137/3677; Y10T 137/7841; Y10T 137/7842; Y10T 137/7776; Y10T 137/7777; B60C 29/002; B60C 29/068; F16K 15/20–15/207
USPC ...... 137/224, 226, 228, 512.2, 512.3, 493.3, 137/493.6
See application file for complete search history.

(56) References Cited

U.S. PATENT DOCUMENTS

| | | | | |
|---|---|---|---|---|
| 1,006,159 A | * | 10/1911 | Wetherholt | B60S 5/043 137/224 |
| 1,116,528 A | * | 11/1914 | Woodward | F16K 15/20 137/226 |
| 1,137,209 A | * | 4/1915 | Henemier | F16K 15/20 137/226 |
| 1,144,499 A | * | 6/1915 | Owens et al. | B60S 5/043 137/224 |
| 1,175,208 A | * | 3/1916 | Vosler | B60S 5/043 137/224 |
| 1,183,071 A | * | 5/1916 | Kaiser | B60S 5/043 137/224 |
| 1,243,521 A | * | 10/1917 | Henemier | B60S 5/043 137/224 |
| 1,297,239 A | * | 3/1919 | Potter | B60C 23/0403 116/34 R |

(Continued)

*Primary Examiner* — Craig J Price
(74) *Attorney, Agent, or Firm* — Global Intellectual Property Agency, LLC; Jordan Sworen

(57) ABSTRACT

A self-regulating tire valve for use in pneumatic tires. The self-regulating tire valve includes a tubular housing with a primary channel extending therethrough, a threaded collar on one end of the tubular housing adapted to connect to a source of pressurized air, a cavity positioned adjacent to the primary channel, and a release passageway connecting to a release outlet positioned on the exterior of the tubular housing. A diverting block is positioned with a secondary channel extending therethrough that is moveably positioned within the cavity. When the secondary channel of the diverting block is aligned with the release passageway, air can flow from a second end to a first end of the secondary channel, through the release passageway and exit at the release outlet.

5 Claims, 4 Drawing Sheets

(56) References Cited

U.S. PATENT DOCUMENTS

| | | | | |
|---|---|---|---|---|
| 1,355,230 A * | 10/1920 | Kaiser | B60C 23/0496 | 137/224 |
| 1,454,409 A * | 5/1923 | Richter | B60S 5/043 | 137/224 |
| 1,476,154 A * | 12/1923 | De Wolfe | G01L 17/00 | 137/224 |
| 1,934,571 A * | 11/1933 | Sutton | F16K 15/20 | 137/224 |
| 2,022,196 A * | 11/1935 | Greco | F16K 15/20 | 137/224 |
| 2,442,361 A * | 6/1948 | Hulman | F16K 24/04 | 137/506 |
| 2,954,796 A * | 10/1960 | Marshall | F16K 15/207 | 137/226 |
| 3,426,787 A * | 2/1969 | Fuller | B60C 23/0496 | 137/226 |
| 3,491,786 A * | 1/1970 | Bermingham | F16K 15/207 | 137/102 |
| 3,910,305 A * | 10/1975 | Hughes | B60C 23/0496 | 137/224 |
| 3,969,936 A | 7/1976 | Lindsay | | |
| 4,015,623 A * | 4/1977 | Wanstreet | B60C 23/0496 | 137/224 |
| 4,015,624 A * | 4/1977 | Wanstreet | F16K 15/20 | 137/224 |
| 4,046,163 A * | 9/1977 | Novak | B60C 29/06 | 137/469 |
| 5,029,604 A * | 7/1991 | Spektor | F16K 15/20 | 137/226 |
| 5,054,511 A * | 10/1991 | Tuan | B60C 23/0496 | 137/224 |
| 5,365,967 A * | 11/1994 | Moore | B60C 23/0496 | 116/34 R |
| 5,377,539 A | 1/1995 | LaSalle | | |
| 5,694,969 A * | 12/1997 | DeVuyst | B60C 29/06 | 137/226 |
| 7,073,527 B1 * | 7/2006 | Freire Teiga | F16K 15/205 | 137/226 |
| 7,237,439 B1 | 7/2007 | Rutherford et al. | | |
| 7,574,920 B2 | 8/2009 | Rutherford et al. | | |
| 7,624,752 B2 * | 12/2009 | Huang | F16K 15/207 | 137/226 |
| 8,393,205 B2 * | 3/2013 | Casner | B60C 23/007 | 73/146 |
| 8,893,741 B2 * | 11/2014 | Weng | F04B 53/10 | 137/224 |
| 2008/0078450 A1 * | 4/2008 | Milanovich | F16K 15/207 | 137/230 |
| 2012/0138189 A1 | 6/2012 | Lunn | | |

* cited by examiner

SELF-REGULATING TIRE VALVE

CROSS REFERENCE TO RELATED APPLICATIONS

This application claims the benefit of U.S. Provisional Application No. 62/157,677 filed on May 6, 2015. The above identified patent application is herein incorporated by reference in its entirety to provide continuity of disclosure.

BACKGROUND OF THE INVENTION

The present invention relates to tire valves. More specifically, the present invention related to self-regulating tire valves that automatically maintain tire pressure once a designated internal tire pressure has been reached, and can be permanently installed on a standard vehicle tire.

One of the most important aspects of tire maintenance is ensuring that a tire is inflated to an optimal internal pressure. Tires that are overinflated beyond the recommended pressure run the risk of rupturing and wearing down the center of the tire tread more readily. Conversely, tires that are underinflated cause the outer edges of the tire tread to wear more quickly, as well as causing increased drag and rolling friction, which results in faster wear of the tire and lower fuel economy for the vehicle.

Recommended tire pressures are often indicated on the sidewall of a tire as well as on the inside frame of the vehicle. Users must use a pressure gauge to check the current tire pressure. Such gauges can either be integral to the source of compressed air, such as a gauge installed on the working end of an air pump, or can be stand-alone devices. While these gauges can offer an accurate reading of air pressure, they often require a user to stop pumping air to check the pressure, requiring many breaks in the pumping process. While some integral gauges show the internal tire pressure without requiring a user to pause the pumping action, they still require a user to know the recommended tire pressure and have the ability to quickly stop pumping air at the appropriate time, a task that can be cumbersome and difficult for many users due to the trial and error nature of that technique.

There exist gauges in the prior that are configured to be installed between a tire valve and an air source. These gauges, however, are not meant to be permanently attached to the valve. While there does exist additional gauges that are designed for a more permanent attachment, these gauges are merely designed to convey the air pressure reading and are not capable of protecting a tire from over-inflation.

SUMMARY OF THE INVENTION

In view of the foregoing disadvantages inherent in the known types of tire valves now present in the prior art, the present invention provides a tire valve wherein the same can be utilized for providing convenience for the user when inflating a tire to a specific internal pressure. The present system includes a tubular housing with a primary channel extending therethrough, a threaded collar on a first end of the tubular housing adapted to connect to a source of pressurized air, a second end for securement to the opening of a tire, a cavity having an opening on the second end of the tubular housing and positioned adjacent to the primary channel, and a release passageway extending from the cavity to a release outlet positioned on the exterior of the tubular housing. A diverting block is positioned with a secondary channel extending therethrough that is moveably positioned within the cavity. When the secondary channel of the diverting block is aligned with the release passageway in an open position, air can flow from a second end to a first end of the secondary channel, through the release passageway and exit at the release outlet. A spring is placed next to the diverting block and configured to bias the diverting block toward a closed position. When the internal air pressure of a tire is stronger than the force of the spring, the diverting block moves into the open position.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
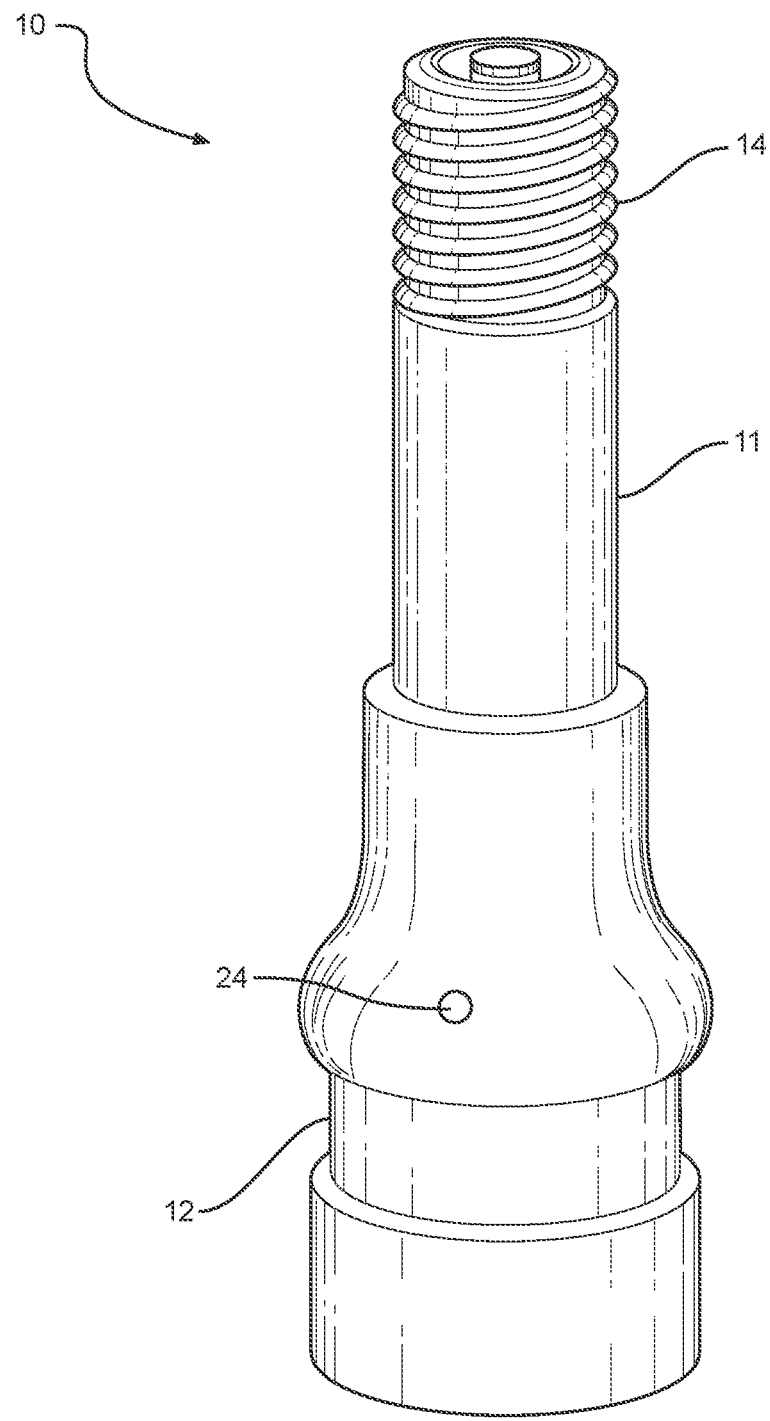
FIG. 1 shows a perspective view of an embodiment of the self-regulating tire valve.

Reference is made herein to the attached drawings. Like reference numerals are used throughout the drawings to depict like or similar elements of the self-regulating tire valve. The figures are intended for representative purposes only and should not be considered to be limiting in any respect.

Referring now to FIG. 1, there is shown a perspective view of an embodiment of the self-regulating tire valve. The self-regulating tire valve 10 comprises a tubular housing 11 with a circumferential notch 12 that is configured to fit within a tire aperture to a close tolerance. A release outlet 24 is disposed on the exterior of the tubular housing 11, wherein the release outlet is configured to release pressurized air to the exterior of the valve, outside of a tire. The first end of the tubular housing 11 comprises a threaded collar 14 that is adapted to connect to a source of pressurized air, such as an air compressor, for use in inflating the tire to which the tire valve 10 is affixed.

Figure 2:
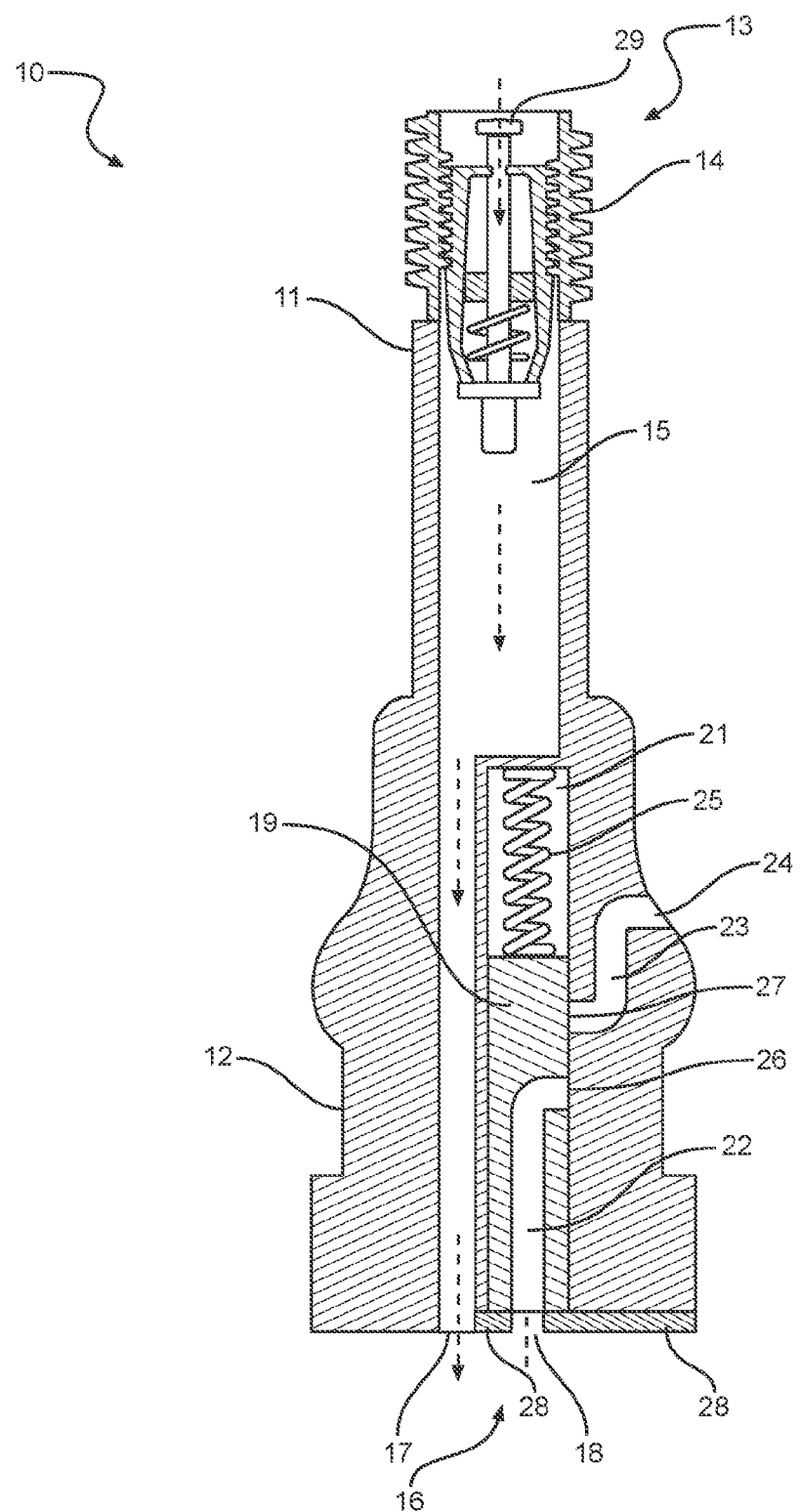
FIG. 2 shows a cross sectional view of an embodiment of the self-regulating tire valve with the diverting block in a closed position.
Figure 3:
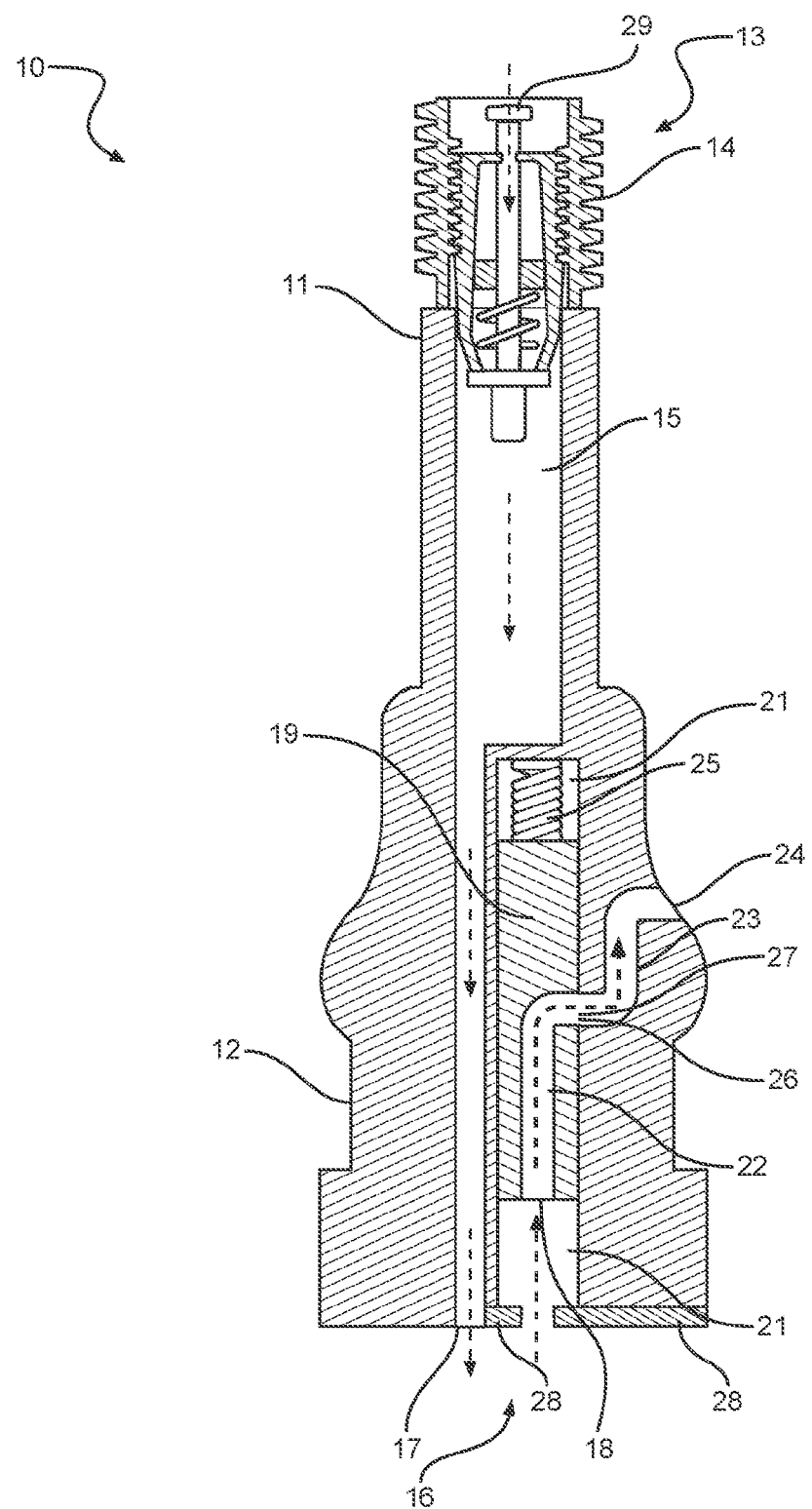
FIG. 3 shows a cross sectional view of an embodiment of the self-regulating tire valve with the diverting block in an open position.

Referring now to FIGS. 2 and 3, there are shown cross sectional views of an embodiment of the self-regulating tire valve. A primary channel 15 extends from a first end 13 of the tubular housing 11 to a second end 16. In some embodiments of the self-regulating tire valve 10 there is a poppet valve 29 disposed on the first end 13 of the tubular housing 11, configured to allow compressed air to flow inward from the exterior of the self-regulating tire valve 10 to the primary channel 15 and prevent compressed air from escaping.

A cavity 21 is disposed within the tubular housing 11 adjacent to the primary channel 15 with a diverting block 19 positioned therein. The cavity 21 has an opening at the second end of the tubular housing so as to allow air from within the tire to flow into the cavity 21. The diverting block 19 comprises a secondary channel 22 extending therethrough with a first end 26 and a second end 18 and is configured to move between a first position, as shown in FIG. 2, and a second position, as shown in FIG. 3.

A resistance mechanism 25 is disposed between a wall of the cavity 21 and the diverting block 19, configured to bias the diverting block 19 into the second position. When the diverting block 19 is in the second position, the first end 26 of the secondary channel 22 is obstructed by the interior of the tubular housing 11. There is a restraint element 28 disposed at the second end of the tubular housing 11 and configured to prevent the spring 25 from pushing the diverting block 19 beyond the area of the cavity 21. When the spring 25 is compressed and the diverting block 19 is in the first position, the first 26 end of the secondary channel 22 is aligned a first end 26 of a release passageway 23 and a continuous path is formed from the second end 18 of the secondary channel 22 to the release outlet 24 located at the second end of the release passageway 23 and disposed on the exterior of the tubular housing 11.

Figure 4:
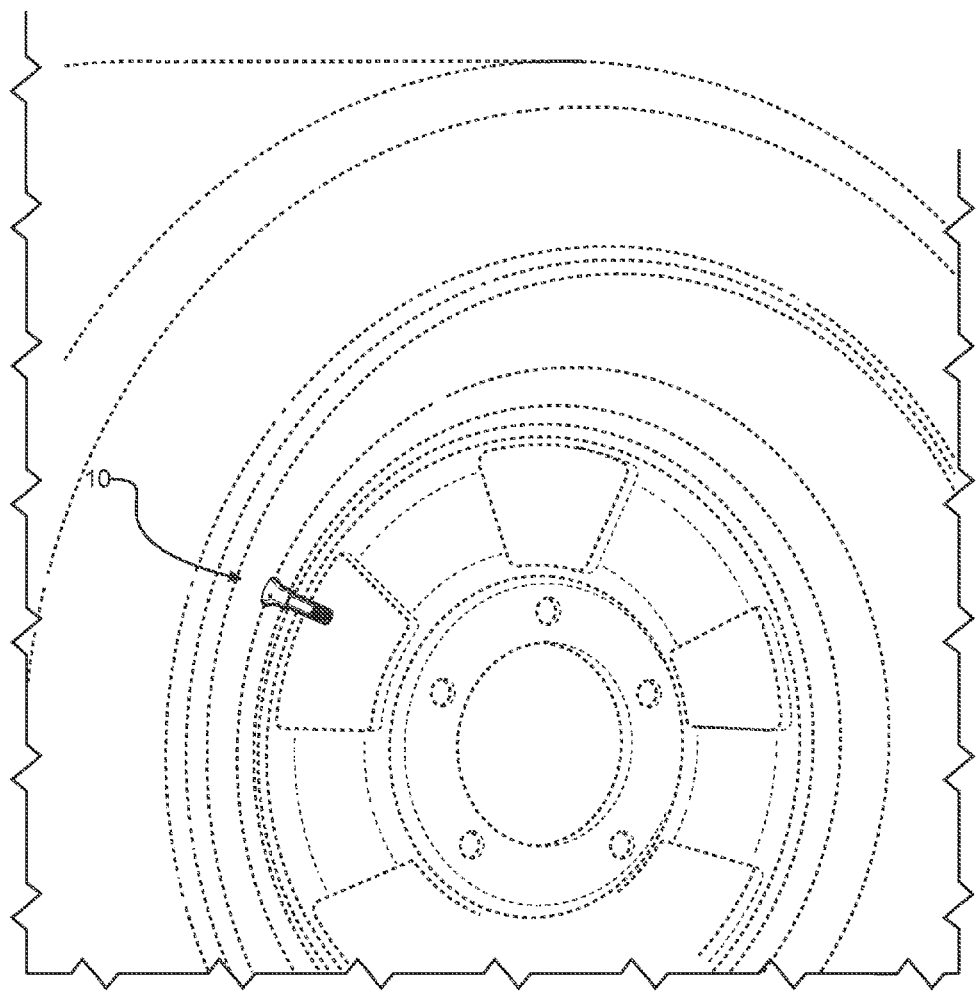
FIG. 4 shows a perspective view of the self-regulating tire valve installed in a tire.

The self-regulating tire valve 10 is configured to be installed in a tire by positioning the circumferential notch 12 within an aperture in a tire that is adapted to receive valves to a close tolerance, such that the section from the notch to the first end 13 of the self-regulating tire valve 10 is located exterior to the tire, and the section from the notch to the send end 16 of the self-regulating tire valve is located in the interior of the tire as shown in FIG. 4.

The threaded collar 14 is adapted to connect to a source of compressed air. Incoming compressed air travels through the poppet valve 29 along the primary channel 15 and enters the tire at the second end 17 of the primary channel 15. Once the internal pressure of the air within the tire exceeds a threshold force of the spring 25, the internal air pushes the diverting block 19 outward from the tire, compressing the spring 25 and moving the diverting block 19 into a first position, aligning the secondary channel 22 with the release passageway 23 and allowing air from inside the tire to escape. Once the internal pressure has been reduced to below the threshold force of the spring 25, the spring 25 overcomes the air pressure and pushes the diverting block 19 back into the second position, preventing air from escaping and ensuring that the predetermined internal pressure is attained. In some embodiments of the self-regulating tire valve 10, the spring 25 is configured to apply force such that an internal air pressure within the range of 172,369 to 275,790 Pascal, or 25 to 40 pounds per square inch, will push the diverting block 19 into the first position, releasing excess pressurized air.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self-regulating tire valve, comprising:
   a tubular housing including a first end, a second end, and an exterior surface including a circumferential notch extending annularly around the second end of the tubular housing and a threaded collar extending annularly around the first end of the tubular housing;
   a primary channel disposed within the tubular housing, the primary channel extending from the first end to the second end;
   a cavity disposed within the tubular housing, the cavity adjacent to the primary channel;
   a release passageway extending from the cavity to a release outlet disposed on the exterior surface of the tubular housing,
   a diverting block movably positioned within the cavity, the diverting block comprising a secondary channel including a first end and a second end, wherein the diverting block is configured to move between a first position in which the secondary channel is aligned with the release passageway, thereby forming a continuous pathway from the second end of the secondary channel to the release outlet, and a second position in which the secondary channel is not aligned with the release passageway, thereby forming an obstruction of the first end of the secondary channel;
   a resistance mechanism disposed within the cavity, the resistance mechanism configured to bias the diverting block towards the second position;
   a poppet valve disposed radially inwardly relative to the threaded collar and within the first end of the tubular housing, the poppet valve configured to control a flow of air between the primary channel and an exterior of the tubular housing.

2. The self-regulating tire valve of claim 1, wherein the resistance mechanism is configured to move the diverting block into the first position when an air pressure in a range between 172,369 and 275,790 Pascal is applied to the diverting block from the second end of the tubular housing, so as to release excess pressurized air to an area exterior to the tubular housing.

3. The self-regulating tire valve of claim 2, wherein the resistance mechanism is a spring.

4. The self-regulating tire valve of claim 1, further comprising a restraining element at the second end of the tubular housing configured to retain the diverting block within the cavity.

5. The self-regulating tire valve of claim 1, wherein the tubular housing has a cylindrical shape.

* * * * *